United States Patent
Suzuki et al.

[11] Patent Number: 5,842,198
[45] Date of Patent: Nov. 24, 1998

[54] DATA MANAGEMENT SYSTEM, THAT ENABLES A USER TO CONNECT EXISTING DATA TO AN EXTERNAL FILE AND A PROGRAM TO PROCESS THAT DATA

[75] Inventors: Toshikatsu Suzuki; Yoshifumi Matsunaga; Shinichiro Taniguchi, all of Nakai-machi; Eiji Ishida, Yokohama; Hiroyuki Ishima, Nakai-machi, all of Japan

[73] Assignee: Fuji Xerox Co., Ltd., Tokyo, Japan

[21] Appl. No.: 630,252

[22] Filed: Apr. 10, 1996

[30] Foreign Application Priority Data

Apr. 28, 1995 [JP] Japan ................... 7-127518

[51] Int. Cl.$^6$ .................................. G06F 17/30
[52] U.S. Cl. ...................................... 707/2; 707/3
[58] Field of Search .................... 395/602, 603; 707/2, 3

[56] References Cited

U.S. PATENT DOCUMENTS

| | | | |
|---|---|---|---|
| 4,879,648 | 11/1989 | Cochran et al. | 345/353 |
| 5,325,523 | 6/1994 | Beglin et al. | 395/602 |
| 5,402,339 | 3/1995 | Nakashima et al. | 395/601 |
| 5,418,888 | 5/1995 | Alden | 395/64 |
| 5,457,792 | 10/1995 | Virgil et al. | 395/603 |
| 5,499,359 | 3/1996 | Vijaykumar | 707/201 |
| 5,511,186 | 4/1996 | Carhart et al. | 707/2 |
| 5,564,119 | 10/1996 | Krawchuck et al. | 707/4 |
| 5,608,624 | 3/1997 | Luciw | 395/794 |
| 5,608,907 | 3/1997 | Fehskens et al. | 395/672 |
| 5,640,501 | 6/1997 | Turpin | 395/768 |

FOREIGN PATENT DOCUMENTS

| | | |
|---|---|---|
| 0 342 964 | 11/1989 | European Pat. Off. . |
| 1-194026 | 8/1989 | Japan . |
| 3-160536 | 7/1991 | Japan . |
| 5-27962 | 2/1993 | Japan . |
| 5-88953 | 4/1993 | Japan . |

OTHER PUBLICATIONS

Matsubara, "Word Processing Text and Table Data, Entering the Era of the Database," *Nikkei Byte*, No. 10, Oct. 1990, pp. 300–311.

*Primary Examiner*—Wayne Amsbury
*Attorney, Agent, or Firm*—Oliff & Berridge, PLC

[57] ABSTRACT

A data management system which enables a user to flexibly make corresponding relation between data stored in a existing database, and a data file and a program for processing the data file, is disclosed. A user register in advance corresponding relation between a data unit stored in a existing database, and a data file and a program for processing the data file, both of which exist outside of said first database. After the retrieval of the data unit from the existing database, if the corresponding relation for the retrieved data unit is registered, the program related to the data unit is activated for processing the related data file in response to the user's instruction.

12 Claims, 15 Drawing Sheets

| ID NUMBER (21) | NAME (22) | DATA BODY (23) | KEYWORDS (24) |
|---|---|---|---|
| 1 | CD-ROM | COMPACT DISK READ ONLY MEMORY (CD-ROM) | ACRONYM, ABBREVIATION, CD |
| 2 | LACAN | [ JACQUES LACAN ] A FRENCH PSYCHOANALYST, MIRROR IMAGE STAGE, UNCONSCIOUS ... | PERSON, JACQUES LACAN |
| 3 | XXX INTRODUCTION | TITLE: XXX INTRODUCTION AUTHOR: OOO PUBLISHER: △△△ | BOOK, XXX, OOOO, △△△, INTRODUCTION |
| ⋮ | ⋮ | ⋮ | ⋮ |

FIG.2

| ID NUMBER (31) | FILE NAME (32) | PROGRAM NAME (33) |
|---|---|---|
| 1 | IMAGEFILE 1 | IMAGEVIEWER |
| 2 | SOUNDFILE 1 | SOUNDPLAYER |
| ⋮ | ⋮ | ⋮ |
| N | TEXTFILE N | TEXTVIEWER |

FIG.3

| ID NUMBER 171 | NAME 172 | DATA BODY 173 | KEYWORDS 174 |
|---|---|---|---|
| 1 | OBJECT 1 | FILE NAME: TEXTFILE 1<br>PROGRAM NAME: PROGRAM 1 | ID94 |
| 2 | OBJECT 2 | FILE NAME: TEXTFILE 2<br>PROGRAM NAME: PROGRAM 2 | ID22 |
| 3 | OBJECT 3 | FILE NAME: TEXTFILE 3<br>PROGRAM NAME: PROGRAM 3 | ID20333 |
| ... | ... | ... | ... |

| ID NUMBER | NAME | DATA BODY | KEYWORDS |
|---|---|---|---|
| 1 | OBJECT 1 | FILE NAME: TEXTFILE<br>PROGRAM NAME: PROGRAM A<br>FILE FORMAT: TEXT | ID94 |
| 2 | OBJECT 2 | FILE NAME: IMAGEFILE<br>PROGRAM NAME: PROGRAM B<br>FILE FORMAT: XXX-FORMAT | ID22 |
| 3 | OBJECT 3 | FILE NAME: SOUNDFILE<br>PROGRAM NAME: PROGRAM C<br>FILE FORMAT: YYY-FORMAT | ID20333 |
| ... | ... | ... | ... |

FIG.14

| FILE FORMAT | PROGRAM NAME |
|---|---|
| TEXT | PROGRAM TA |
| IMAGEFORMAT 1 | PROGRAM IA1 |
| IMAGEFORMAT 2 | PROGRAM IA2 |
| IMAGEFORMAT 3 | PROGRAM IA3 |
| SOUNDFORMAT 1 | PROGRAM SA1 |
| SOUNDFORMAT 2 | PROGRAM SA2 |
| ⋮ | ⋮ |

FIG.15

DATA MANAGEMENT SYSTEM, THAT ENABLES A USER TO CONNECT EXISTING DATA TO AN EXTERNAL FILE AND A PROGRAM TO PROCESS THAT DATA

BACKGROUND OF THE INVENTION

1. Field of the Invention

The present invention relates to a data management system for storing, retrieving and utilizing information (data) on computers. In detail, this data management system stores data with a point mechanism for activating a specified processing corresponding to the stored data under the various conditions or on the multi platforms, without increasing difficulty of management, retrieves stored information and immediately utilize or recover them. This system can store information of many kinds of media form, as a result, can be used in many kinds of utility form.

2. Description of the Related Art

In a conventional art, there are two types of the systems to store and retrieve data as follows;

(1) Each of the data unit is made of a set of smaller data components, (2) Each of the data unit is identified, but the data structure of the contents thereof is not concerned.

The system configuration method of these two cases are different.

The database system is the most famous system configuration for the case (1), and the filing system is for the case (2).

In the database system, each of the data unit is structured as a set of components, for example, a "record" is a set of "field" in the relational database, and a "object" is a set of "instance valuable" in the object-oriented database, and both of these structures of the databases are ruled by a "schema" or a "class definition", respectively. Because data units are stored in the database based on those rules, it is possible to retrieve a data unit from the database in various directions.

For example, in the relational. database of personnel information, one record is formed for one person, and each record includes a plurality of fields, such as "name", "gender", "date of birth", "address", "member's number" or "department of belonging". A retrieval of the records in accordance with conditions, such as "a women born in 1960" or "a person belonging to the YY department living in XX city" is easy to do. It is difficult, though, to add a new information which does not match the predetermined schema of this database, to the record data.

Japanese Laid-Open Patent Publication Hei.1-194026 discloses an art related to an addition of a personal memo information to the data in the database. Japanese Laid-Open Patent Publication Hei.3-160536 discloses an apparatus which has a storage to store a processing corresponding to the data in the database. When the data is accessed, the processing corresponding to it is activated and process the data, if the processing is registered in the storage.

However these techniques cannot register the external information existing outside of the database when the information related to the data unit is in the database.

On the other hand, the latter filing system disclosed in the Hei.3-160536 stores information as a file, and can retrieve the file in accordance with conditions such as "the name of the file begins with ZZ." In this case, the content of the retrieved file can be various and is not concerned. For this reason, the file system is configurated so as to identify the file types corresponding to some file formats, in order to display the content of the file.

As a result, this filing system can display any kind of content of files, for example, documents edited by a word processor, image data scanned by a scanner, or data of a spread sheet, if it is recognized. But the filing system does not interpret the data in accordance with the fixed schema used in the database. Unconcern of the content of the file is the feature of the filing system. Each filing system has its own availability for treating the variousness of the file contents and for displaying or recovering the file contents.

For example, Magellan, the text database produced by the Lotus Development Co. Ltd., provides the similar function to the database, which can display data files of some kinds of applications without any user's consciousness for the format of the data file. But in this text database, because the way of transformation is fixed, user cannot edit the corresponding relation (Nikkei Byte, pp.300–311 , no. 10, 1990.)

The database system does not provide a function to edit freely the corresponding relation between the data stored in database and external data and a processing for calling and executing the external data, both of which exist outside of the database. In other words, the data structure defined by the database schema is not permitted to change, and other various external files and programs to process the files cannot relate to the database.

On the other hand, since the filing system determines the program uniformly on the system side in accordance with the type or format of the data file, a user is not permitted to determine his original corresponding relation to the specified file. It is only permitted to add new corresponding relation between a specified file type and a program or to change the corresponding relation.

SUMMARY OF THE INVENTION

An object of the present invention is to resolve the problem described above. The first object of this invention is to provide a data management: system which enables a user to flexibly make corresponding relation between data stored in a existing database, and a data file and a program for processing the data file, wherein both the data file and the program exist outside of the existing database.

The second object of this invention is to simplify the configuration of the data management system by sharing the storing mechanism and the retrieval mechanism for the corresponding relation with those for the data in the existing database.

Further, the third object of this invention is to provide a data management system to execute a program appropriate to process the external data file which is related to data stored in the existing database on the different platforms.

According to a first aspect of the present invention, there is provided a data management system that comprises a first database for storing a plurality of data units, a plurality of data files each of which exists outside of the first database, at least one program each of which processes at least one of the data files, the program existing outside of the first database, external relation storing means for storing at least one external relational information each of which relates the data unit stored in the first database to at least one of the data files and at least one of the program, database retrieval means for retrieving at least one of the data units from the first database, user instruction receiving means for receiving a user's instruction to activate the program, and file and program determining means for determining at least appropriate one of the data files and at least appropriate one of the program, both of which are related to the data unit retrieved by the database retrieval means, in accordance with the data unit retrieved by the database retrieval means and the external relational information stored in the external relation storing means in response to the user's instruction by the user instruction receiving means so as to activate the at least appropriate one of the program for processing the at least appropriate one of the data files.

Further, a data structure of the external relation storing means is made same as that of the first database, so that the database retrieval means can also retrieve the external relational information.

Further, file format relation storing means for storing file format relation which relates a file format to a program for processing a file defined by the file format, is also comprised, and the program to be activated is determined in accordance with the file format of the data file.

BRIEF DESCRIPTION OF THE DRAWINGS

FIG. 2 shows an example of a data structure of a database according to the present invention;

FIG. 3 is an example of a data structure of an object data table referred by the external object reference management section in the first embodiment;

FIG. 11 is an example of a data structure of an external object management database in the second embodiment;

FIG. 14 is an example of a data structure of an external object management database in the third embodiment;

FIG. 15 is an example of a program alternate table;

DESCRIPTION OF THE PREFERRED EMBODIMENTS

Figure 1:
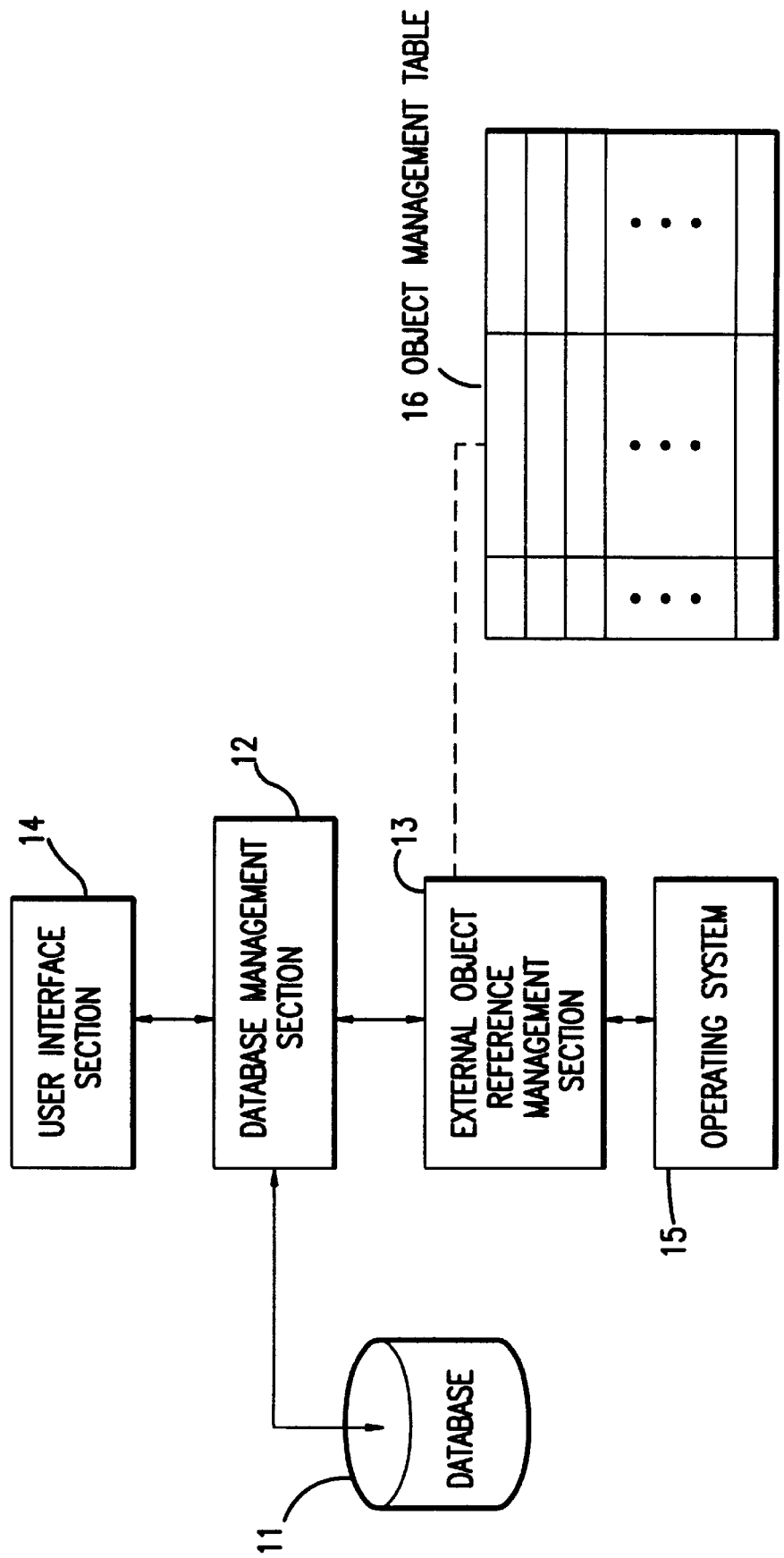
FIG. 1 is a block diagram illustrating main sections of the data management system in the first embodiment according to the present invention.

In the following, the embodiments of this invention are described referring to the drawings. FIG. 1 shows a block diagram of main sections of the database management system in the first embodiment. FIG. 1 includes a database 11, a database management section 12, an external object reference management section 13, a user interface section 14, an operating system 15 and an object management table 16. Although there is no reference in FIG. 1, data files and programs also stored in the filing system outside of the database 11. Each of the data files and the programs is referred as an external object, if there is no need to specify whether it is.

A database 11 usually includes a plurality of data units and is stored in a secondary memory of an computer system, and a database management section 12 executes some processing for the database, such as retrieval, edit and maintenance. A user interface section 14 controls an interaction between the data management system and a user of this system.

The object management table 16 stores external relation which relates the data unit in the database 11 and the data file and the program to process the data file. For example, it is stored in a form of table so that a file name and a program name is corresponded to an identifier for identifying the data unit in the database.

The external object reference management section 13 refers the object management table 16 which stores, as described above, the pair of the file name and the program name to process it corresponding to one of the data units stored in the database 11, and retrieves the file name and the program name in accordance with the data unit retrieved by the database management section 12. The file name and the program name retrieved by the external object reference management section 13, are transferred to the operating system 15. Operating system 15 controls processors, i/o devices, memories and other things of the computer system in accordance with the file name and the program name received from the external object reference management section 13 so as to process the data file identified by the file name by the program identified by the program name, such as to display the contents of the data file.

FIG. 2 shows an example of a data structure of the database 11. The data structure of the database 11 is in a table form as shown in FIG. 2. A row of the table 20 represents a data unit stored in the database. The data unit is structured by an ID number field 21, a name field 22, a data body field 23 and a keywords field 24. An ID number stored in ID number field is assigned to each of the data unit, and is used to identify each of the data unit in the database uniquely. In this embodiments, the system automatically assigns a unique ID number to each of the data unit.

The name field 22 stores a name for the data unit. The user who register the data unit can freely give the name to the data unit. The data body field stores a data body which is a main portion of the data unit. The keywords field 24 stores keywords to retrieve the data unit. In this embodiment as shown in FIG. 2, keywords are listed and separated by comma. A user can retrieve a desired data by inputting keywords and instructing to start retrieving through the user interface section 14. It is possible to include other information in the data unit. For example, the data unit can include a date or time which the data unit is registered. The keywords in the keywords field 24 are only required for a keyword retrieval of the database. That is to say, the keywords field 24 is not required, if other retrieval methods, such as full text retrieval, are used. It is also possible to exclude the name field and to include the name of data unit in a part of the data body field. Further, instead of the automatic assignment of the ID number for each of the data unit to identify it, it is possible to identify the data unit by the name of the data unit. In this case, an automatic check mechanism is required to check the uniqueness of the name in the system.

FIG. 3 shows a data structure of the object management table 16 referred by the external object reference management section 13 in this embodiment. As shown in FIG. 3, the object management table 16 includes an ID number field 31, a file name field 32 and a program name field 33. The object management table 16 is in a table form, and a row of the table represents an entry storing external relation which is corresponding relation between the data unit in the database 11 and the external objects. In other words, the entry is a set of three data, that is, the data stored in the ID number field 31, in the file name field 32 and in the program name field 33.

The ID number field 31 stores the ID number assigned to one of the data units stored in the database 11. The entry of the object management table 16 is related to one of the data units stored in the database by the ID number. The external reference management section 13 retrieves a file name from the file name field 32 and a program name from the program name field 33 of the entry in accordance with the ID number in the ID number field both of which are related to the data unit having the same ID number stored in the database.

Figure 4:
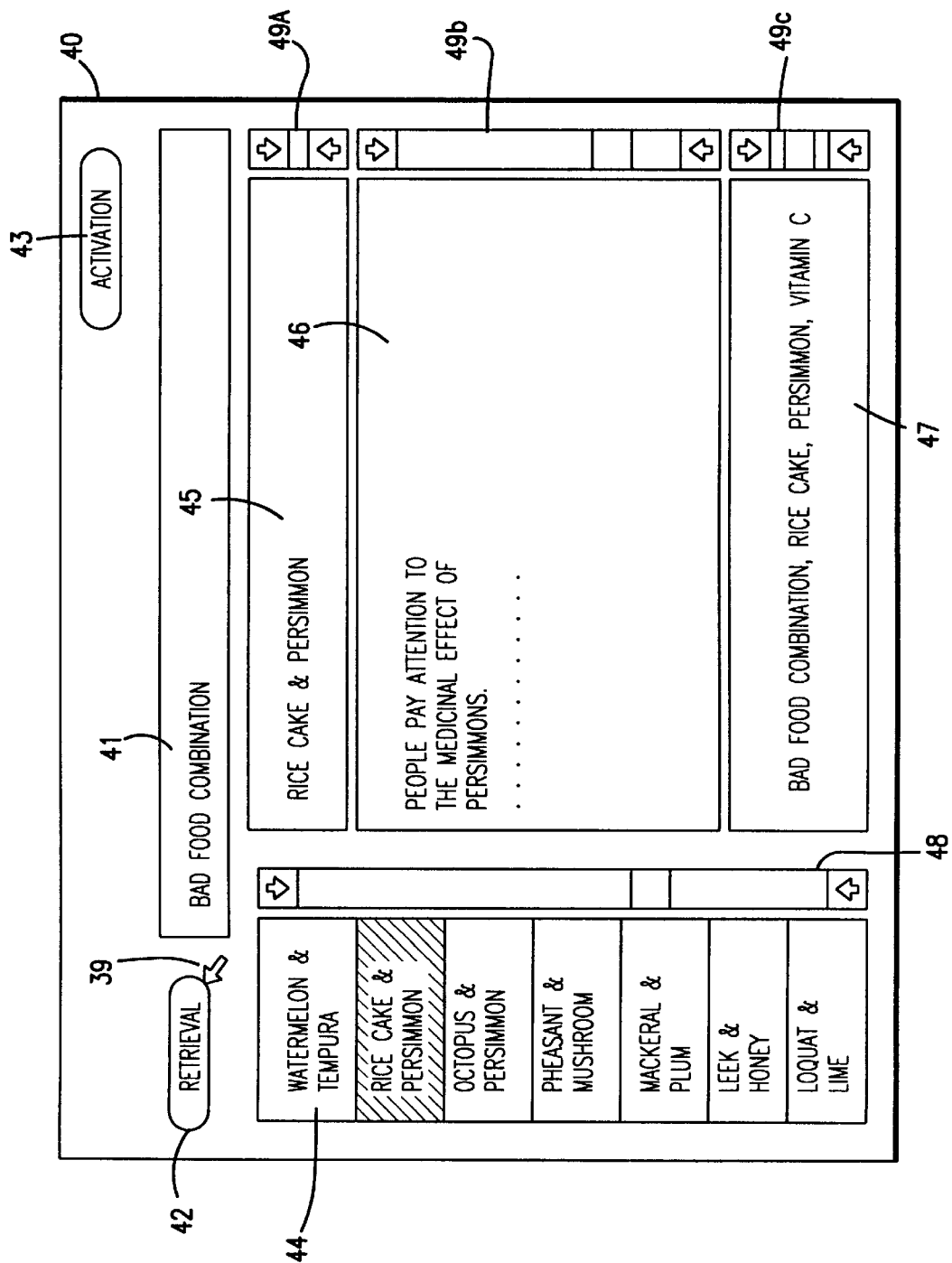
FIG. 4 is an example of a window for a data retrieval processing displayed on a screen by the user interface section.

FIG. 4 shows an example of a view of a window for the retrieval displaying on the screen controlled by the user interface section 14. FIG. 4 includes a mouse pointer 39 and a window 40.

The mouse pointer 39 is a cursor displaying on the screen whose position is controlled by a mouse. A user can input an instruction to the system by positioning the cursor on the button displaying on the screen and clicking the mouse. The window 40 is graphic image displaying on the screen for the interaction between the user and the system and controlled by the user interface section 14. The window 40 includes a search key input area 41, a retrieval instruction button 42, a program activation instruction button 43, a retrieval result displaying area 44, a name displaying area 45, a data body displaying area 46, a keywords displaying area 47, and scroll bars 48, 49a, 49b and 49c. The search key input area 41 is an area for inputting a character string as the search key. The retrieval instruction button 42 is a button for instructing to start the retrieval processing. The program activation instruction button 43 is a button for instructing to activate the program related to the data unit in the database retrieved by the retrieval processing as a retrieval result. The retrieval result displaying area 44 is an area for displaying the name list of the retrieved data units. A user can select one of the data unit whose name is listed here. The name displaying area 45 is an area for displaying the name of the data unit selected from the name list displayed in the retrieval result displaying area 44. The data body displaying area 46 is an area for displaying the data body of the selected data unit. The keywords displaying area 47 is an area for displaying the keywords in correspondence with the selected data unit. Scroll bars are equipped for the time when these displaying areas are too small to display all data to be displayed in each of the displaying areas.

Scroll bar 48 is equipped for the time when all the name of the retrieved data unit cannot be displayed in the retrieval result displaying area 44. The user can confirm all the retrieved data by scrolling up or down the retrieval result displaying area. 44. In the same manner, the scroll bar 49a is for scrolling the name displaying area 45, the scroll bar 49b is for the data body displaying area 46 and the scroll bar 49c is for the keywords displaying area 47. For simplicity, FIG. 4 excludes buttons and menus of the conventional art, which is not required for the explanation of this invention.

In the example shown in FIG. 4, when a user inputs "bad food combination" as a search key, and clicked the search instruction button 42 by the mouse pointer 39, the database retrieval processing starts. As a result of the database retrieval processing, data units each having a keyword "bad food combination" in the keywords field 20 are retrieved and then a list of the names of retrieved data units is displayed in the retrieval result displaying area 44. For instance, when the database is a dictionary, the name of the data unit is called as a head word. When the retrieved data units to be displayed in the retrieval result displaying area 44 overflow, a user scrolls the display of the retrieval result displaying area 44 by using the scroll bar 48, and can confirm all of the retrieved data.

When a user selects one of the listed name in the retrieval result displaying area 44 by the mouse pointer 39, the display condition of the selected name is changed. In FIG. 4, for instance, "rice cake & persimmon" is selected, and the display area of this name is shaded. After the selection, the name, the data body and the keywords of the selected data unit are displayed in the name displaying area 45, the data body displaying area 46 and the keywords displaying area, respectively. In FIG. 4, "rice cake & persimmon" is displayed for the name, "People pay attention to the medicinal effect of persimmons. . . . " is for the data body and "bad food combination, rice cake, . . . " are for keywords in each of the displaying area. If the data to be displayed in these area overflow, it is possible to scroll and display the overflown data by using scroll bars 49a, 49b, and 49c, respectively.

Figure 5:
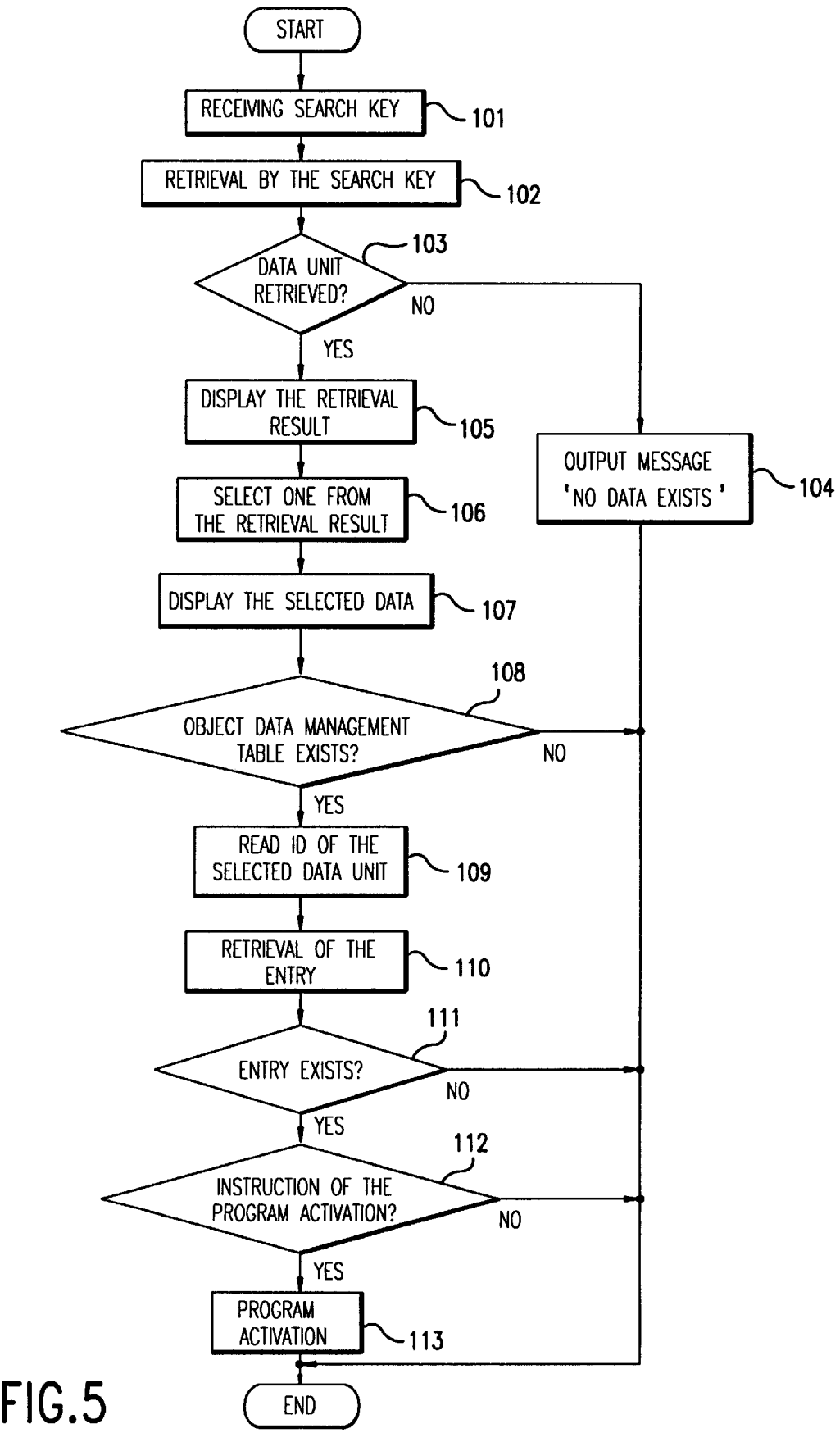
FIG. 5 is a flowchart illustrative of a data retrieval processing in the first embodiment.

FIG. 5 shows a flowchart of the database retrieval processing in the first embodiment of the present data management system. In the following, the flow of the processing from the retrieval of the data unit from the database to the program activation related to the retrieved data unit is explained in detail.

At the beginning of the retrieval processing, in step 101, a search key receiving processing is executed. In other words, search keys, which are input in the search key input area 41 by the user, are received. In step 102, the database management section 12 retrieves data units from the database using the received search keys. In step 103, it is checked whether or not the data unit is retrieved as the retrieval result. If no data unit is retrieved, after the outputting of the message to inform the user of no data unit corresponding to the inputted search key in step 104, the processing terminates.

If the data unit is retrieved, in step 105, a list of the names of the retrieved data units is displayed. And then in step 106, the data selection processing is executed. In this step, a user selects one of the names of the retrieved data units listed in the retrieval result displaying area 44 by the mouse pointer 39. In step 107, selected data unit is read from the database 11 and displayed. As a result, the name, the data body and the keywords of the selected data unit read from the database 11 are displayed in the name displaying area 45, the data body displaying area 46 and keywords displaying area 47, respectively.

In step 108, it is checked whether the object management table 16 which is referred by the external object reference management section 13, exists or not. If this table does not exist, the processing terminates. On the other hand, if the table exists, then in step 109, the external object reference management section 13 obtains the ID number of the data unit which is selected and so displayed on the screen. In step 110, the external object reference management section 13 retrieves the entry having the ID number corresponding to that of the selected data unit from the object management table 16. In step 111, it is (checked whether the entry is retrieved or not.

If no entry is retrieved, the processing terminates. On the other hand, if the entry is retrieved, then in step 112, it is checked whether the program activation instruction button 43 is clicked by the mouse pointer. If an instruction button other than the program activation instruction button 43 is clicked, then this processing terminates. If the program activation instruction button 43 is clicked, in step 113, the external object activation processing, described below, is executed in accordance with the entry retrieved in the step 110.

Figure 6:
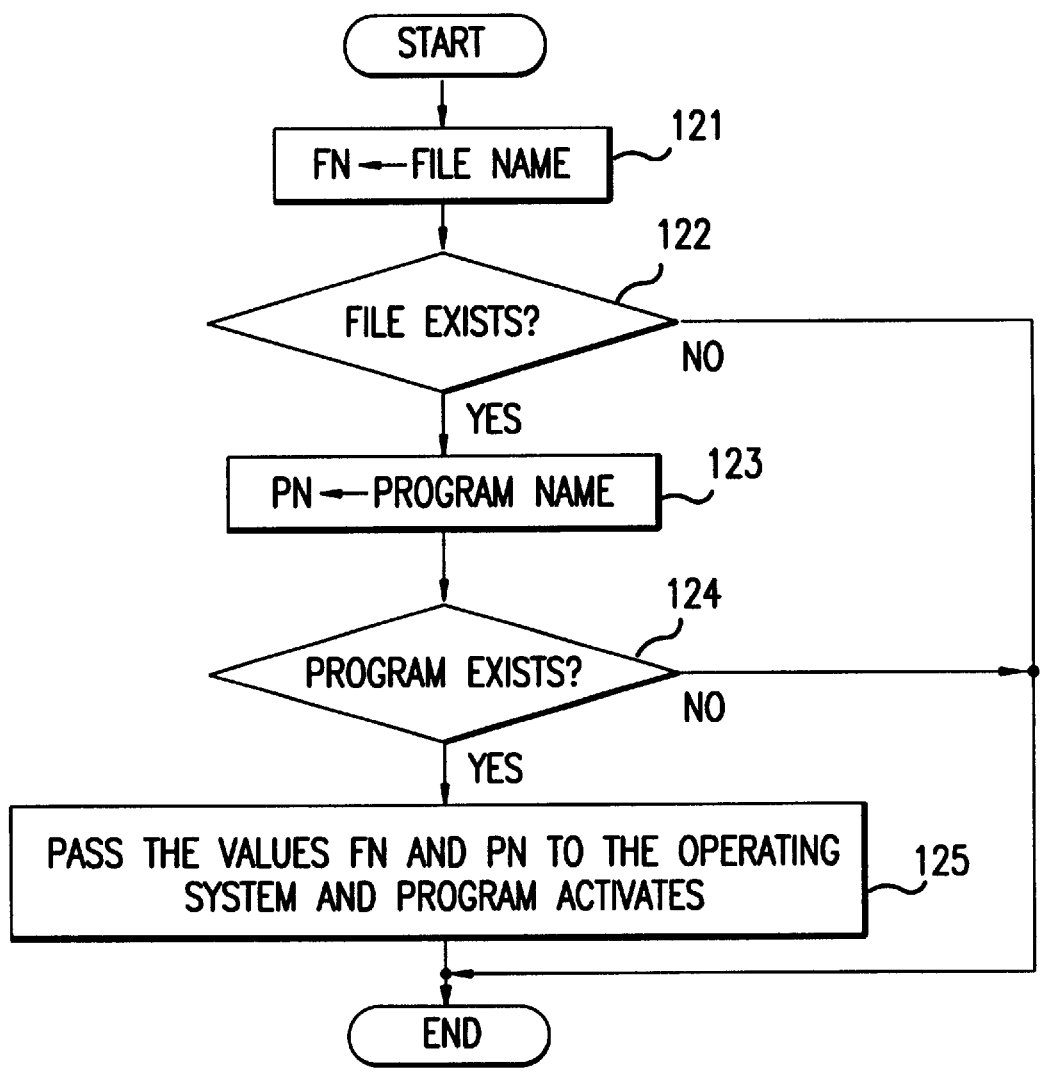
FIG. 6 is a flowchart illustrative of an external object activation processing in the first embodiment.

FIG. 6 shows a flowchart to explain the external object activation processing. At the beginning of this processing, in step 121, the file name in the entry retrieved in step 110 is obtained from the object management table 16 referred by the external object reference management section 13, and is assigned to the valuable FN. In step 122, it is checked whether the file identified by the file name assigned to the valuable FN exists or not. If the file does not exist, this processing terminates.

If the file identified by the file name of the valuable FN exists, then in step 123, the program name in the entry retrieved in step 110 is obtained from the object management table 16, and is assigned to the valuable PN. In step 124, it is checked whether the program identified by the program name of the valuable PN exists or not. If it does not exist, this processing terminates. On the other hand, if the program identified by the program name of the valuable PN exists, then in the next step 125, the file name of the valuable FN and the program name of the valuable PN are passed to the operating system 15. After the program identified by the obtained program name is applied to the data file identified by the file name through the function of operating system, the procedure terminates.

As described above, the data retrieved from the database is displayed, and the program related to the retrieved data is immediately executed in response to the user's instruction.

Figure 7:
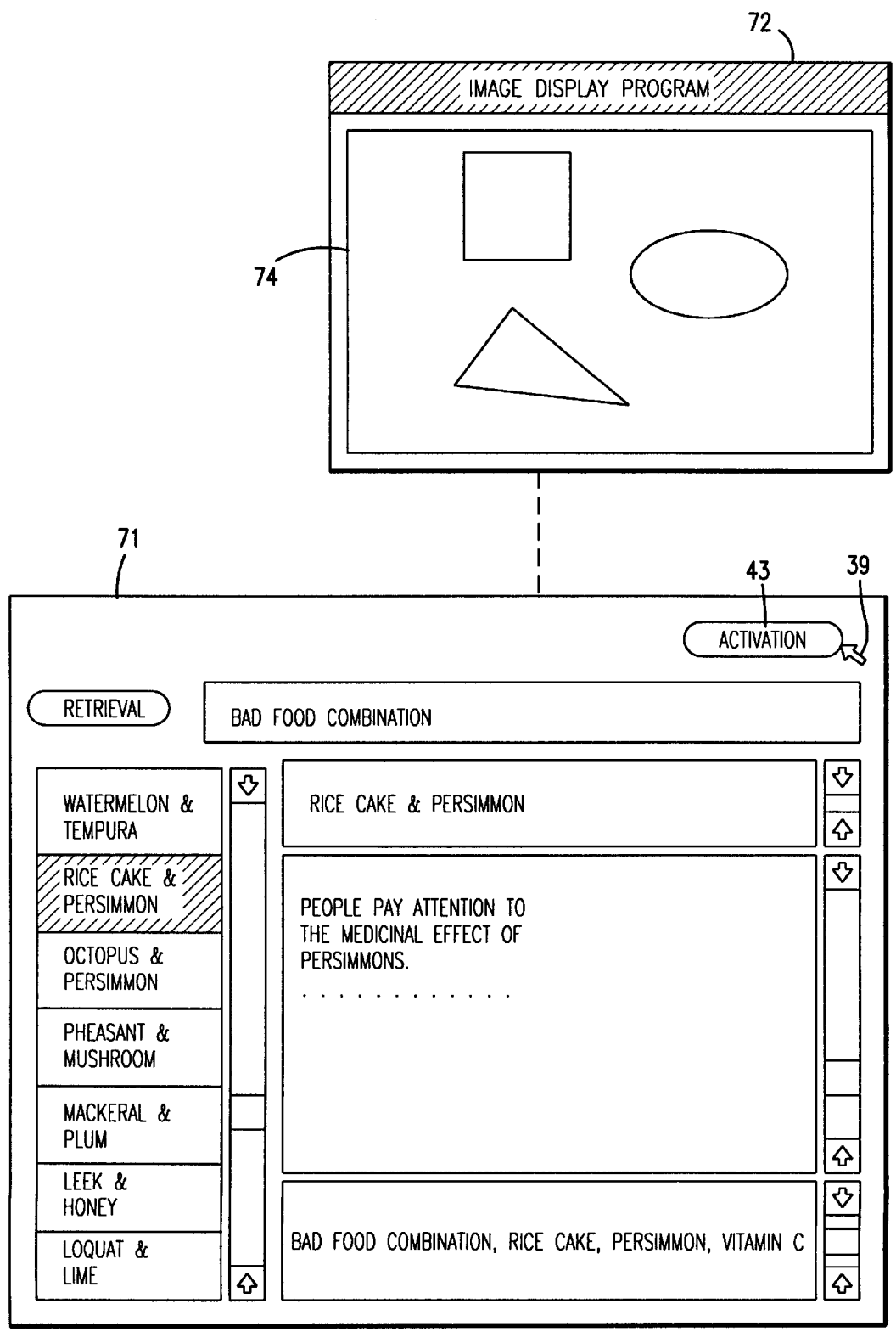
FIG. 7 is an example showing the display condition after an execution of an image display processing which is related to the retrieved data unit from the database.

FIG. 7 shows a diagram for explaining the example of an operation to activate an image displaying program related to the retrieved data unit. A window 71 shows a display condition after the contents of the selected data unit are displayed in step 107 of the flowchart in FIG. 5. In this example, the inputted search key is the "bad food combination", and the selected data unit is "rice cake & persimmon". In this embodiment, the program activation instruction button 43 is set valid and so displayed only when the entry corresponding to the selected data unit exists, in accordance with the check of step 111 in the flowchart of FIG. 5. If this valid program activation instruction button 43 is clicked by the mouse pointer 39, the program related to the displayed data unit is activated. In this case, for instance the file and the program related to the selected data unit are the image file which stores image data, and the image displaying program which reads the image data stored in the image file and display it on the screen, respectively. As a result of the execution of this image display program, a view window 72 is opened and then image 74 is displayed in the view window 72.

In other words, the entry including the file name of the image data file, the program name of the image display program and the ID number same as that of the selected data unit is stored in the object management table 16 which is referred by the external object reference management section 13. Instead of the image file and the image display program, if a pair of the text file and text display program is related to the selected data unit, the contents of the text file are displayed. Further, if the file name identifies a text file and the program name identifies a program which activate a text editor, an editor operation window is opened so that a user can edit the text file immediately.

Figure 8:
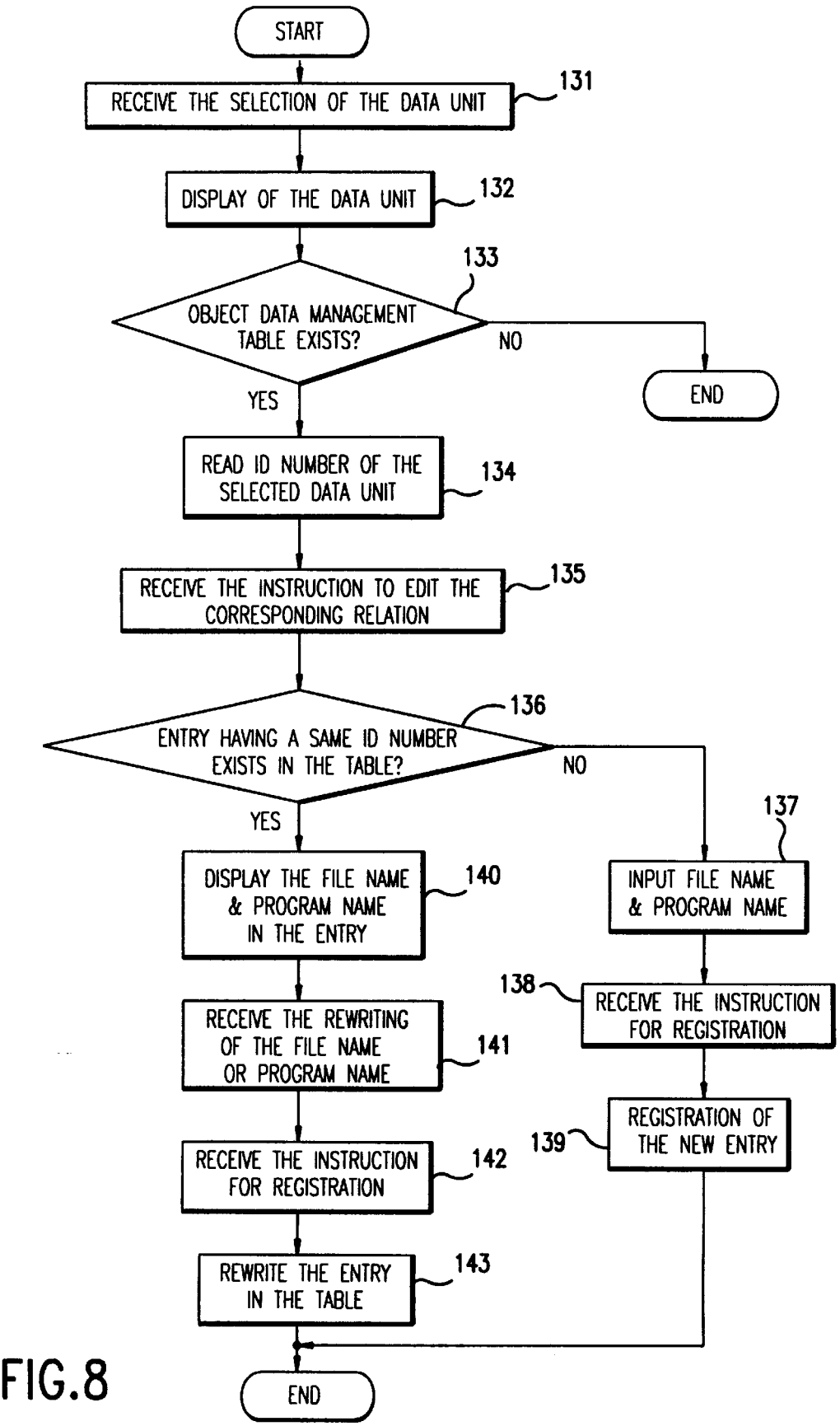
FIG. 8 is a flowchart illustrative of a registration processing of the corresponding relation.
Figure 9:
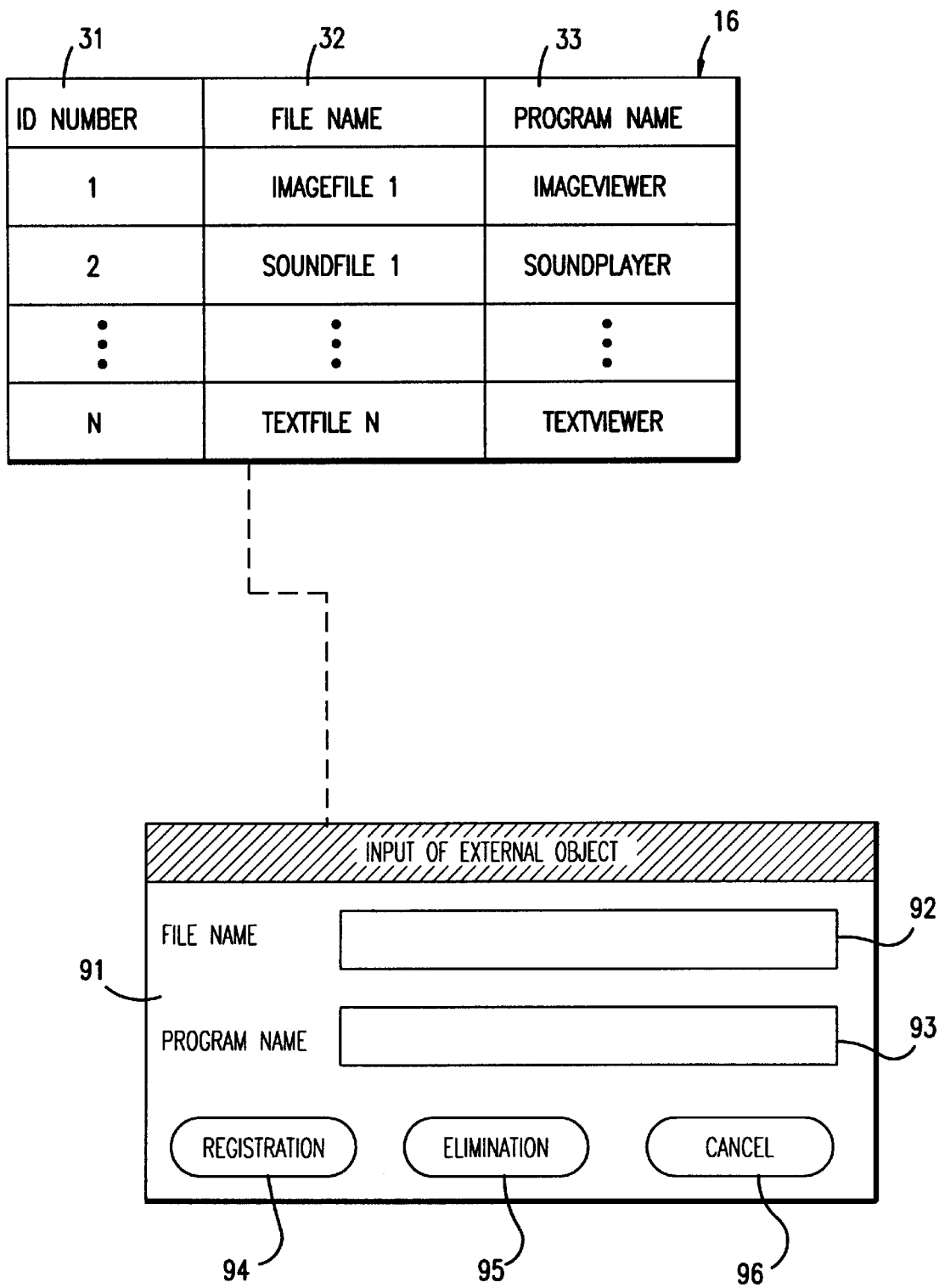
FIG. 9 is an example of an input window for the registration processing.

In the following, an external object edit processing is explained. This processing includes three sub-processings, that is, a new registration of the external relation, a modification of the existed external relation and an elimination of the external relation. FIG. 8 shows a flowchart of the external object registration processing. FIG. 9 shows an example of an external object input window to be used for the external object edit processing. The act of this processing is explained referring to these figures.

At first, the configuration of the external object input window is explained. FIG. 9 includes the external object input window 91 displayed on the screen which has a file name input area 92, a program name input area 93, a registration button 94, an elimination button 95 and a cancel button 96. The file name input area 92 and the program name input area 93 are the areas for inputting the file name and the program name to be related to one of the data units in the database, respectively. The object management table 16 shown in FIG. 9 is same as the one of FIG. 3. After the input of the file name and the program name, if a user gives an registration instruction by clicking the registration button 94, the input file name, the input program name and the ID number of the data unit to be related are stored in the file name field 32, the program name field 33 and the ID number field in a entry, respectively, as external relation. The elimination button 95 is used for eliminating the entry existed in the object management table 16.

In the following, the external object edit processing, which is instructed by using the input operation display described above, is explained referring to the flowchart shown in FIG. 8.

This flowchart includes the registration processing and the modification processing. At the beginning of this processing, in step 131, a selection of the data unit of the database is received and then the contents of the selected data unit is displayed. In detail, for instance, as described in the FIG. 4, if one of the names listed in the retrieval result displaying area 44 is selected by the mouse pointer, the contents of the data unit identified by the selected name are displayed. In other words, the data name, the data body and keywords of the selected data unit are read from the database and are displayed in the name displaying area 45, the data body displaying area 46 and the keywords displaying area 47, respectively.

In step 133, it is checked whether the object management table 16 which is referred by the external object reference management section 13, exists or not. If the table does not exist, the processing terminates, because it is of course not possible to register the external relation. If the table exists, in step 134, the ID number of the data unit selected in step 131 is obtained. In step 135, if a user instructs to start editing the external relation, the external object input window 91 is opened on the screen and then in step 136, it is checked whether or not the entry whose ID number is corresponding to that of the selected data unit, exists in the object management table 16.

In the check of step 136, if no entry whose ID number is corresponding to the ID number of selected data unit, exists, the processing from step 137 to step 139 is executed so as to register a new entry to the object management table 16. On the other hand, if the entry exists, the processing from step 140 to step 143 is executed so as to modify the entry.

For the new entry registration to the object management table 16, at first in step 137, a user inputs the file name and the program name in the file name input area 92 and the program name input area 93 in the external object input window 91, respectively. In the next step 138, the registration instruction is received by detecting the user's clicking of the registration button 94. In step 139, a new entry of the external relation which relates the external objects and the data unit in the database, is registered to the object management table 16. The ID number field, the file name field and the program name field of the newly registered entry includes the ID number of the selected data unit in the database, the file name inputted to the file name 26 input area 92 and the program name inputted to the program name input area 93, respectively. In this manner, a new entry is registered as the external relation to the object management table 16.

For the modification of the entry existed in the object management table 16, at the beginning, in step 140., the file name and the program name are read from the entry having the ID number corresponding to the ID number of the selected data unit, which is obtained in step 134. And then, the read file name and the read program name are displayed in the file name input area 92 and the program name input area 93, respectively. In the next step 141, a user rewrite the file name or the program name displayed in each of the name input area. In step 142, the registration instruction is received by detecting the user's clicking of the registration button 94. In step 143, after the entry in the object management table 16 is modified in accordance with the rewritten file name and the rewritten program name, this processing terminates.

In other words, in step 142, the start of the registration is instructed in accordance with the file name and the program name rewritten in step 141. In step 143, the file name and the program name stored in the entry are altered by the file name and the program name rewritten in step 141, then the processing terminates. If both of the file name and the program name are not rewritten by the user, there's no need to modify the entry. Further, it is possible to modify the field of the entry only where the name is rewritten by the. user. In this case, whether or not the file name or the program name is rewritten must be detected.

If the cancel is instructed from the user by clicking the cancel button 96 instead of the registration instruction, this processing terminates immediately. Further, if the file or the program identified by the file name or the program name inputted by the user does not exist, it is possible to output the message to inform the user of that matter, and to prompt the user to further input.

In this example, the object management table 16 stores only one entry for each of the data units in the database 11. In other words, each data unit in the database 11 correspond to only one pair of the data file and the program. But it is possible to store more than one entry for one of the data units. In this case, the processing for the modification of the entry does not need. Also, in the database retrieval processing shown in FIG. 5, a plurality of entries may be retrieved in step 110. Because it is something ridiculous to activate all programs related to one of the data unit simultaneously, some modifications are needed for the activation of the program. For example, the window for the retrieval shown in FIG. 4 is configured to include a plurality of program activation instruction buttons each of which corresponds to one of the retrieved entries. Then, after a user selects one of the program activation instruction buttons, the program corresponding to the selected button is activated.

Because the external object reference management section 13 passes the program name to the operating system 15, the program is only required to be executable on the operating system 15. On the other hand, the file name must be in a form to enable to direct the existing position of the file in a file system controlled by the operating system 15. For such a case, the file name must show the relative position from the position where the database exists, or must be in a form like the absolute path. Or it is possible that an area of the storage for files is determined in advance, and that the external object reference management section 13 searches the predetermined area of the storage, if the file name is neither relative form nor absolute form.

As described above, in the data management system of the first embodiment, the object management table 16 is equipped for the purpose of storing a pair of a file name and a program name corresponding to the data unit in the database to apply the program identified by the program name to the data file identified by the file name after the data unit is retrieved. The external object reference management section 13 is also equipped for controlling the execution of the program related to the data unit in the database under the user's instruction.

For this reason, without any change of the data structure of the database, such as the database schema, it is possible to relate external objects, such as a data file or a program, which exists outside of the database, to the data unit in the database, and further to manage the controlling of the processing for the related external objects.

To avoid the complexity of the processing mechanism of the external object reference management section 13, it is possible that the storing mechanism and the retrieval mechanism for the external relation are configurated by the same storing mechanism and the same retrieval mechanism to the database 11. This cause a simple configuration of the data processing of the external object reference management section 13.

In the following second embodiment, this type of system is explained.

Figure 10:
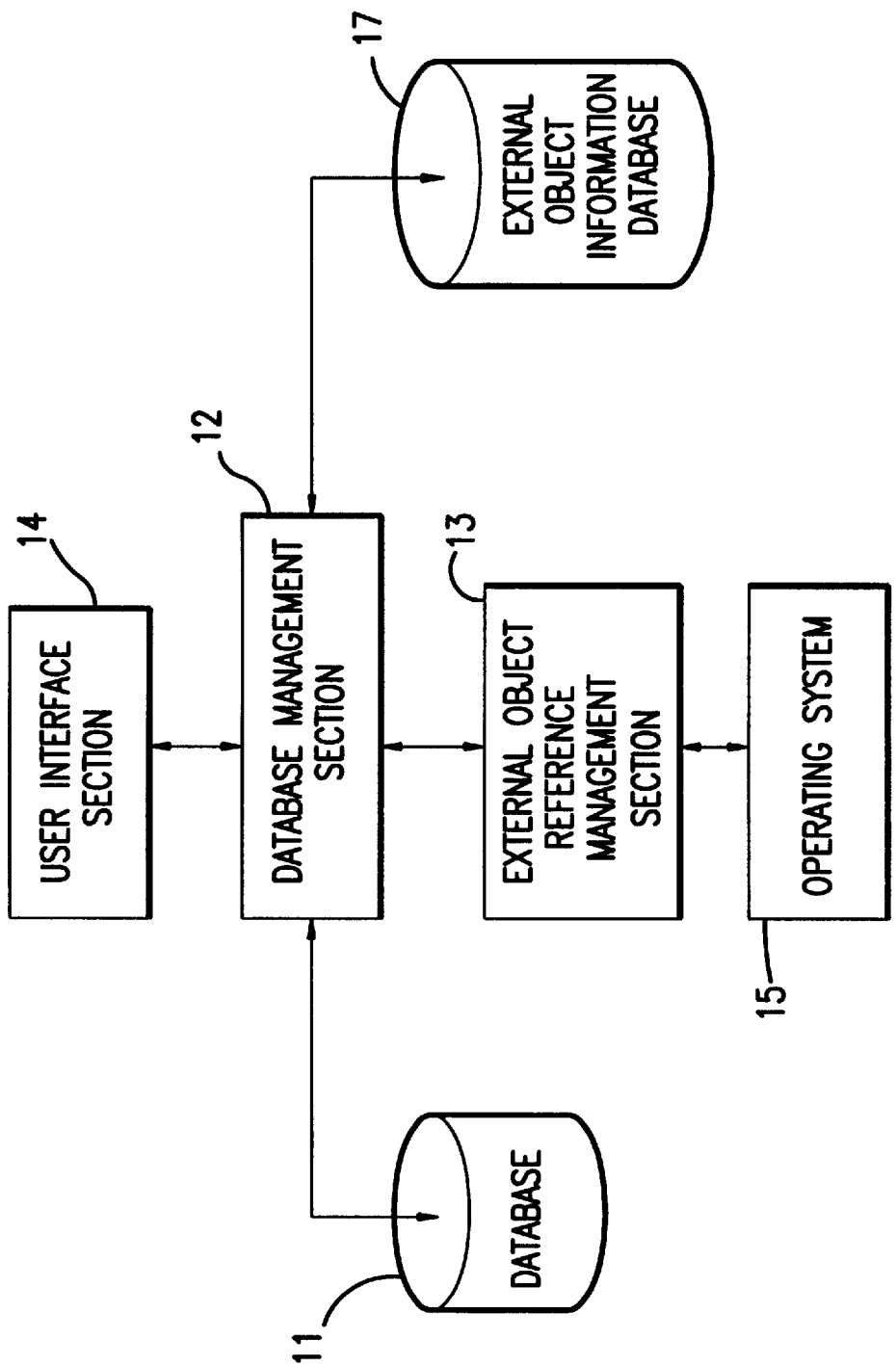
FIG. 10 is a block diagram illustrative of main sections of the data management system in the second embodiment according to the present invention.

FIG. 10 shows a block diagram of main sections of the data management system according to the second embodiment. FIG. 10 includes the database 11, the database management section 12, the external object reference management section 13, operating system 15 and object management database 17.

The database 11, the user interface section 14 and operating system 15 are the same things as described in the first embodiment, and no further explanation is made here. In the second embodiment, the data management system includes the external object database 17 instead of the object management table 16 in FIG. 1.

The object management database 1.7 stores the external relation in the same data structure as the database 11 to relate the external objects to the data unit of the database 11. The database management section 12 retrieves the external relation stored in the object management database 17 as well as the data unit in the database 11. The external object reference management section 13 is responsible for the same function as that of the first embodiment, but because of the change of the data structure to store the external relation, the actual operation is slightly changed.

That is to say, although the external object reference management section 13 directly refers the object management table 16 to manage the external objects to be related to the data unit of the database 11 in the first embodiment, it is configured to be able to use the same storing mechanism and the retrieval mechanism as those for the database 11 in the second embodiment.

As a result, the external object reference management section 13 shares the processing of the storing and the retrieval with the database management section 12, for the management of the external relation. It causes the simplicity for the control of the external object reference management section 13.

FIG. 11 shows the data structure of the external object management database 17 in the second embodiment. The data structure is same as that of the database 11 explained in FIG. 2. As shown in FIG. 11, the external object management database 17 is in a form of table 170, and each of whose row represents a data unit for the external relation which relates to one of the data units stored in database 11 to the data file and the program to process it. The data unit for the corresponding relation includes an ID number field 171, a name field 172, a data body field 173 and a keywords field 174. An ID number stored in the ID number field is assigned to each of the data unit for the external relation, and is used to identify the data unit in the database 17. In this embodiment, the unique ID number is automatically assigned to each of the data unit.

In the name field 172, the name to be assigned to the data unit for the external relation is stored. In the body field 173, the file name and the program name are stored as the data body. For example, in FIG. 11, a character string "Text-Files3" following to the "File name :" represents the file name, and "Program3" following to the "Program name :" represents the program name. In the keywords field 174, the keyword corresponding to the ID number of the data unit stored in the database 11, which is related to the external objects defines by the file name and the program name stored in the data body field 173, is stored. For instance in FIG. 11, the data unit for the external relation of the third row in table 170, whose ID number is "3" and whose data name is "Object3", includes "ID20333" as a keyword in the keywords field. The keyword "ID20333" represents that this data unit for the external relation is related to the data unit whose ID number is 20333 in the data base 11. In other words, this data unit for the external relation can be retrieved by the search key "ID20333."

This type of the external object reference management section 13 is not required to have the original management mechanism for the registration and the retrieval of the external relation. In other words, the processing for the storing or the retrieval of the external relation is executed by the existing database management section 12 in accordance with the instruction from the external object reference management section 13. This cause the simple configuration of the system and further upgrade of the reliability is expected.

Figure 12:
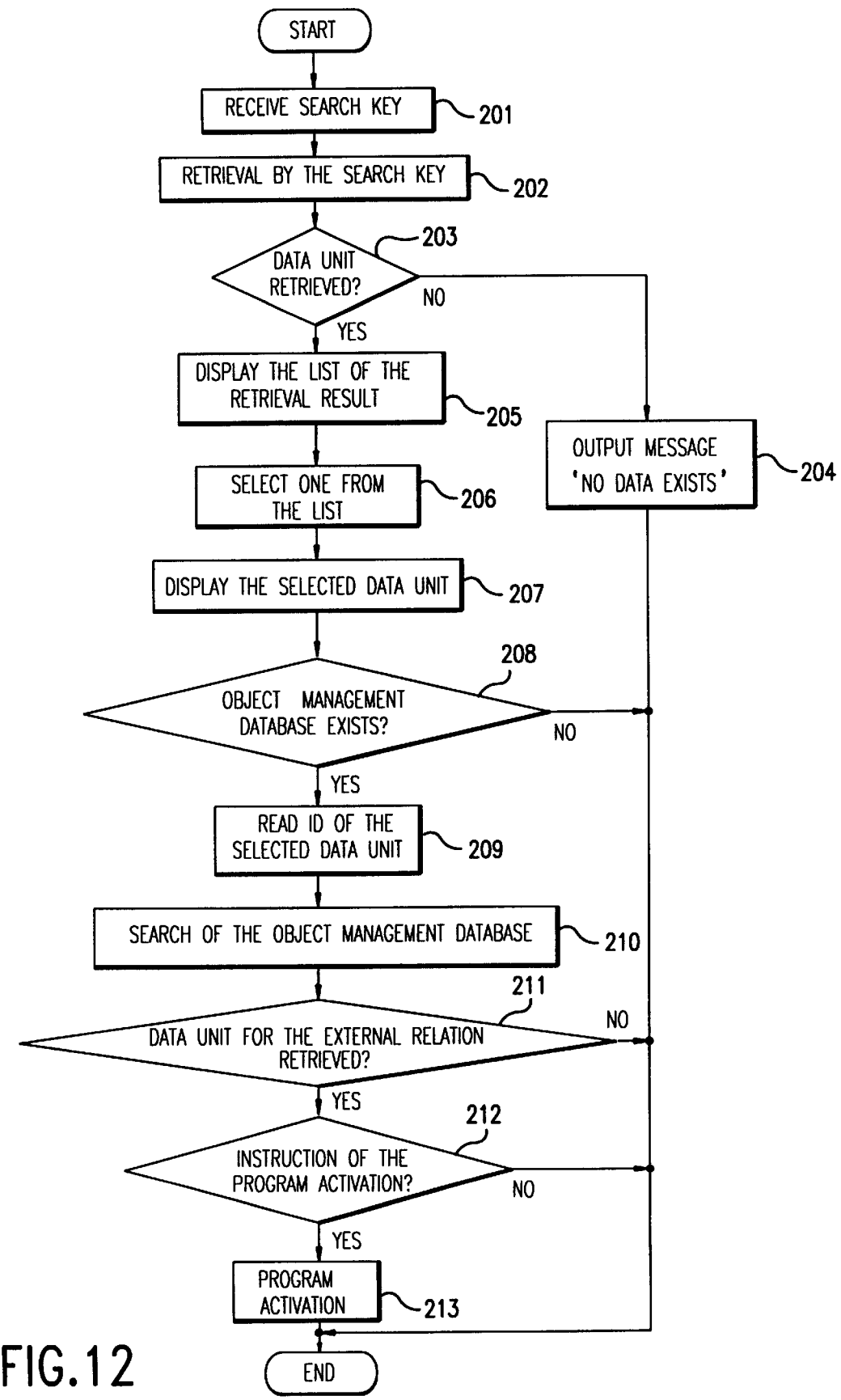
FIG. 12 is a flowchart illustrative of the data retrieval processing in the second embodiment.

FIG. 12 shows a flowchart for explaining the database retrieval processing of the data management system in the second embodiment. In the following, referring to the FIG. 12, the processing from the retrieval of the data unit from the database 11 to the activation of the program related to the data unit retrieved from the database 11, is explained in detail.

The processing from step 201 to step 207 are same as that of from step 101 to step 107 in FIG. 5, respectively. For this reason, the explanation of these steps are not made here, then it is started from step 208.

In step 208, it is checked whether the object management database exists or not. If the object management database does not exist, this processing terminates. If the object management database exists, the steps from 209 to 213 are executed so as to activate the program related to the data unit selected in step 206.

In step 209, the external object reference management section 13 obtains the ID number of the selected and so displayed data unit of the database 11. In the next step 210, the object management database 17 is searched in accordance with the ID number obtained in step 209. In detail, the external object reference management section 13 generates the search key in accordance with the obtained ID number and passes it to the database management section 12. In this embodiment, the character string "ID" and the obtained ID number are concatenated for generating the search key. The database management section 12 receives the search key from the external object reference management section 13, and then retrieves the data unit for the external relation as a retrieval result from the object management database 17 by the search key. In step 211, the retrieval result is checked whether it is empty or not. If the retrieval result is empty, that is to say, no data unit for the external relation is retrieved from the object management database 17, then this processing terminates.

If, in the check of step 211, the data unit for the external relation is retrieved as the retrieval result, then it is checked whether a user indicates the instruction for program activation in step 212. If there is no instruction for program activation from the user, this processing is no more continued. If the user instructs the program activation, for example, by a mouse pointer, after the external object activation processing is executed in step 213, this processing terminates.

This external object activation processing is same as the one described in FIG. 6 except that the external relation is in a form of the data unit in the object management database 17. So only the outline of the processing is explained here referring to the FIG. 6. Referring to the retrieval result obtained in step 210, the character string following to the "File name :" stored in the data body field 173 is read and is assigned to the valuable FN (step 121.) Then, the existence of the data file identified by the file name of the valuable FN is checked (step 122.) If the data file does not exist, this processing terminates here. If the data file exists, further the character string following to the "Program name:" is read and is assigned to the valuable PN (step 123.) The existence of the program identified by the program name of the valuable PN is also checked (step 124.) If the program does not exist, the procedure terminates. On the other hand, if the program exists, the file name of the valuable FN and the program name of the valuable PN are passed to the operating system 15, then the program identified by the program name of the valuable PN is activated through the function provided by the operation system is process the data file identified by the file name of the valuable FN.

The external object edit processing for this embodiment is also almost same as the one described in the first embodiment in FIG. 8. Users do not feel the difference between these two embodiment, because the external object input window for editing the external relation is same as the one shown in FIG. 9. Internal acts are different, because of the difference of the storing mechanism for the external relation. The outline of the difference is explained here referring to the FIG. 8.

In step 136, the external object reference management section 13 generates a search key in accordance with the ID number selected in step 132 and passes it to the database management section 12. The database management section retrieves the data unit for the external relation from the object management database using the search key so as to obtain the retrieval result. If the retrieval result is empty, that means, there is no data unit for the external relation which corresponds to the selected data unit, then the registration processing starts. On the other hand, if the retrieval result includes the data unit for the external relation, the modification processing starts.

In the step 139 of the new registration, the external object reference management section 13 generates the data body which includes the character string "File name :" followed by the inputted file name and "Program name :" followed by the inputted program name, then pass it to the database management system 12. The database management system 12 registers the data body received from the external object management section 13 in the data body field 173, and the search key received in step 136 to the keywords field 174 as the keyword so as to generate new data unit for the external relation. At this time, the ID number and the name of the new data unit are determined automatically.

In the step 143 of the modification, the data body stored in the data body field of the retrieved data unit for the external relation in step 136. That is to say, the file name following to the "File name :" and the program name following to the "Program name :" are modified by the file name and the program name rewritten by the user through the external object input window 91. Other fields are not required to change.

As described above, the data management system of the second embodiment includes the external object reference management section 13 and the object management database 17 to relate a pair of a file and a program for processing the file, which both of the file and the program exist outside of the database originally without any relation to the existing database, to one of the data unit in the existing database. Further, to avoid the complexity of the system configuration, this object management database is structured by the same data structure as the database 11, and this external object reference management section 13 shares the storing mechanism and the retrieval mechanism for the external relation with the database management section 12. This cause the simple configuration of the data processing mechanism. Further, although the database 12 and the object management database 17 are exclusively configurated in this embodiment, the external relation can be registered as the data unit in the database 12, if the database 12 is allowed to register a new data unit.

The data management system of this invention can have a program alternate section so as to enable the program related to the data unit in the database to execute on the multi platforms. In the following, the configuration of this type of data management system of the present invention is explained as the third embodiment.

An example for configurating the system in the case that the database is moved, is explained here. For instance, the database is moved from a memory position to another in a same storage apparatus, is transferred from a storage apparatus to another, or is transferred from a computer system to another so as to be used on it. For a detail example, a database is generated on the desk-top computer system, and then is transferred to the lap-top computer system to be used thereon. In this case, the file and the program related to the data unit in the database must be altered so that it works on the lap-top computer system to which the database is transferred.

As described before, the program name related to the data unit of the database is passed to the operation system and then the operation system executes the program according to the received program name. At this time, there is no problem if the operating system of the computer system to which the database is transferred can execute the program identified by the received program name. But sometimes when the database itself is transferred to another computer system to be used thereon, there is no guarantee for the existence of the program related to the data unit in the database. Further, if the database is transferred among the different operating systems, it would easily happen that the program identified in the first computer system cannot be identified in the second computer system. The program alternate section in the data management system of the third embodiment is equipped for resolving this problem.

Figure 13:
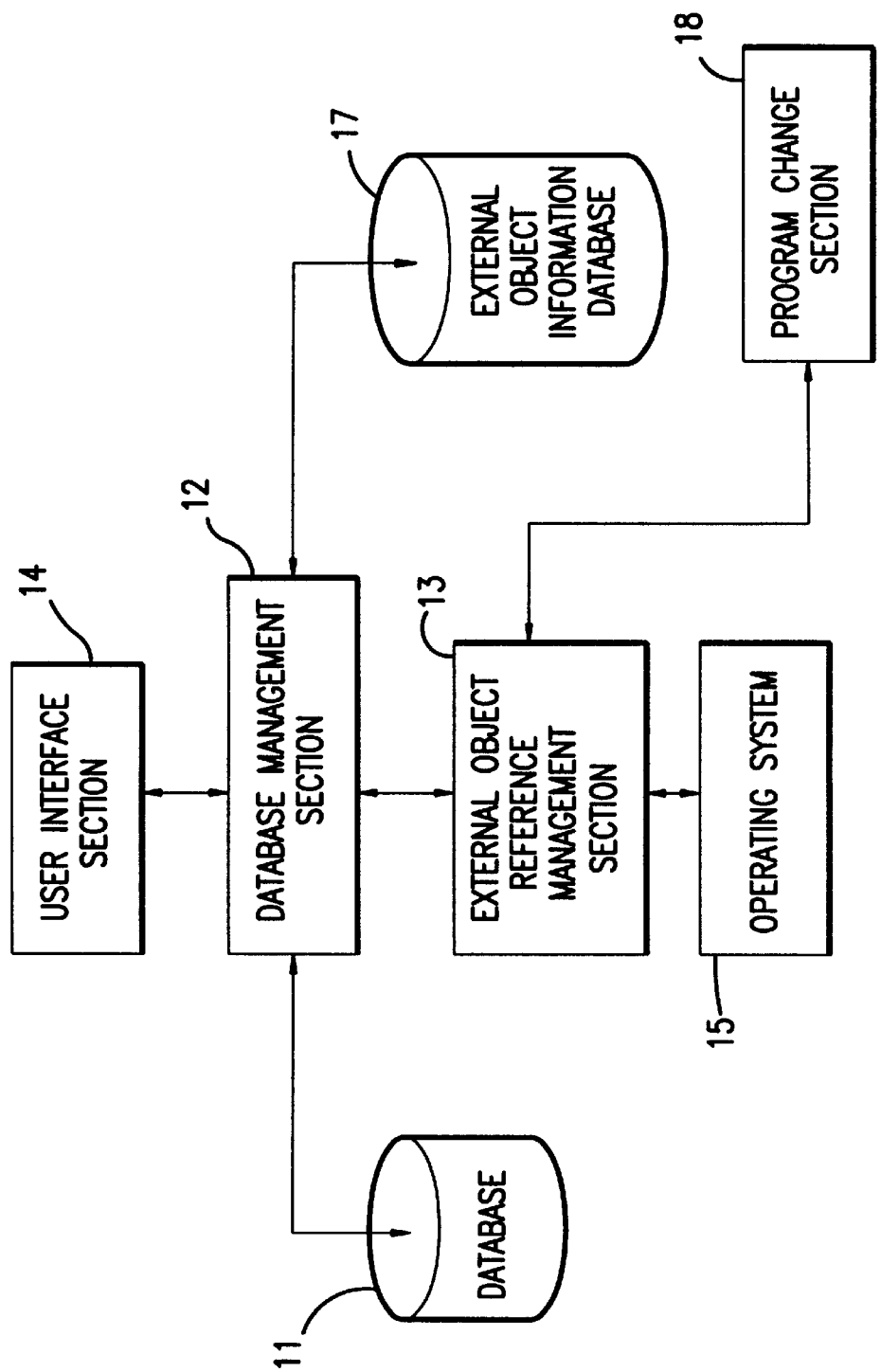
FIG. 13 is a block diagram illustrative of main sections of the data management system in the third embodiment according to the present invention.

The configuration of the data management system in the third embodiment is based on that of the second embodiment. FIG. 13 shows the block diagram illustrative of main sections of a configuration of the data management system in the third embodiment. In FIG. 13, a database 11, a database management section 12, an external object reference management section 13, an operating system 15, a object management database 17 and a program alternate section 18 are included.

The database 11, the database management section 12, the external object reference management section 13, a user interface section 14 and the operating system 15 are almost same as described in FIG. 2. The program alternate section 18 is added in this embodiment.

FIG. 14 shows a data structure of the object management database 17. This data structure is same as that of the database 11 in FIG. 2. That is to say, the data structure of the external object management database 17 is in a form of table 180, each of whose row is a data unit for the corresponding information which relates one of the data unit in the database 11 to the data file and the program to process it. The data unit for the external relation includes an ID number field 181, a name field 182, a body field 183 and a keywords field 184. An ID number in the ID number field 181 is assigned uniquely to each of the data unit, and the data unit is identified by the ID number in the object management database 17.

In the name field 182, same as the second embodiment, the name assigned to the data unit for the external relation is stored. In the body field 183, a file name, a program name and further a file format for using program alternation, are stored. In the keywords field 184, same as the second embodiment, the ID number of the data unit in the database 11 to be related.

For instance, in FIG. 14, the data unit for the external relation of the second row in the table 180, whose ID number is "2" and whose data name is "object2", has the file format information, that is "XXX-Format" following to the "File format:" in the data body field. The file format information is not always required to be stored in the data body field, because it can be determined by checking the contents of the data file. However, to simplify the processing of the program alternate section, the file format information is included in the data body field of the data unit for the external relation in this embodiment.

FIG. 15 shows an example of a program alternate table to be used for altering the program. in accordance with the file format. The program alternate table shown in FIG. 15 is stored in the program alternate section 18. The data structure of this table is, as shown in FIG. 15, is structured from a file format field 151 and a program name field 152. The file format field 151 includes a file format, and the program name field 152 includes a name of program which can process the data file of the file format in the file format field. If the program corresponding to the data file format in the file format field does not exist, the program name field 152 leaves empty. Further, the user can rewrite the program name to be stored in the program name field to the program name which the user customary use. Because it is unrealistic and difficult to list all of the file formats and to prepare a program corresponding to each of the file format, the contents of the program alternate table 150 can be rewritten by the user at any time in this embodiment.

Figure 16:
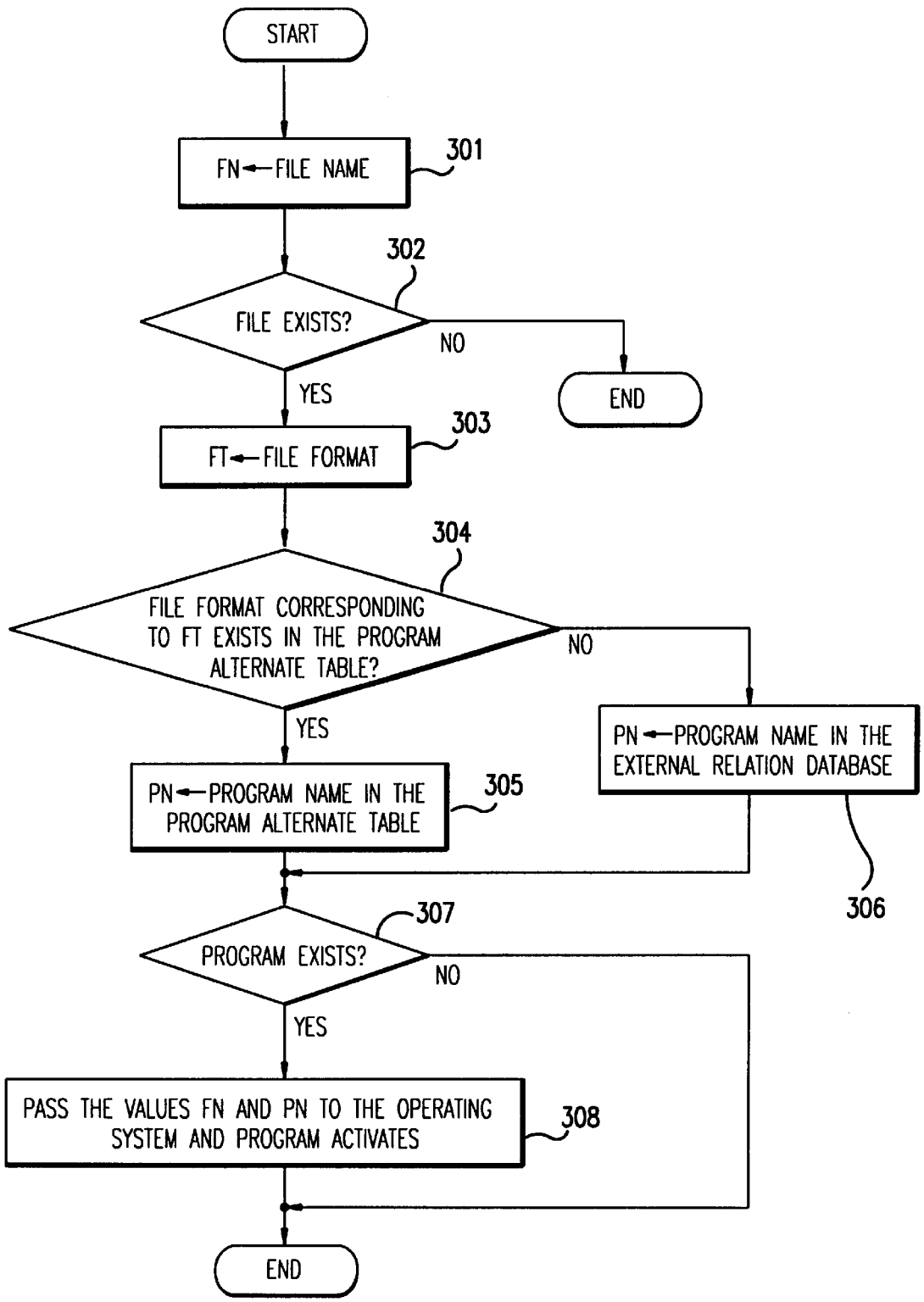
FIG. 16 is a flowchart illustrative of an external object activation processing including the program alternate in the third embodiment.

FIG. 16 shows a flowchart illustrative of the external object activation processing including the program alteration processing of the program alternate section 18. In the following, the external object activation processing executed in the external object reference management section 13, which uses the program alternate section 18, is explained in detail, referring to the FIG. 16.

At the beginning of the processing, in step 301, a character string following to the "File name :" in the data body field of the retrieved data unit for the external relation is read, and is assigned to the valuable FN. In the next step 302, existence of the data file identified by the file name of the valuable FN is checked. As a result of this check, if the data file does not exist, this processing terminates here.

On the other hand, if the data file identified by the file name of FN, a character string following to the "File format :" is read, and stored in the valuable FT in step 303. In the next step 304, it is checked whether the file format which is corresponding to the file format of FT, exists or not in the program alternate table in the program alternate section 18. If the file format exists, in step 304, the program name corresponding to the file format of FT is read from the program alternate table, and is stored in the valuable PN.

If, in the check of the step 304, the existence of the file format corresponding to the FT is not assured, the character string following to the "Program name :" in the body field of the retrieved data unit for the external relation is read, and then is stored in the valuable PN. In this manner, because the program name in the program alternate table has a priority, even if the program name in the data body field is empty, the program name in the program alternate table can be used. In other words, a user is not required to determine the program to be related to the data unit in the database, when the file format of the file to be processed thereby is registered in the program alternate table. This is useful when the database is transferred between the different computer systems.

After the program name is stored in PN in accordance with the file format in the steps described above, whether or not the program identified by the program name of valuable PN exists is checked in the next step 307. As a result of this check, if the program does not exist, this processing terminates here. If the program exists, in step 308, the file name of the valuable FN and the program name of valuable PN is passed to the operating system. And then, after the program is activated through the function of the operation system, the processing is finished.

Further, if the program alternate section 18 further equips the file format converting function for the data file, more flexible processing is possible. For instance, it is possible to convert the data file format automatically before the execution of the processing in the step 304 in FIG. 16. In this third embodiment, the program is dynamically altered in accordance with the data file format at the time of the program activation. But it is possible to alter the external relation referred by the external object reference management section, that is to say, to rewrite the program name in the object management table directly. It is also possible to rewrite all program name at a time, instead of at the every time of the program activation.

In this manner, the data management system of the third embodiment can display or recover the various object on the different computer systems flexibly. Further, it is possible to arrange electronic objects, such as programs or data files, in a cyber space, because the program is carried on in accordance with the file format by using the mechanism of this third embodiment.

What is claimed is:

1. In a computer system that includes a first database that stores a plurality of first data units, a plurality of data files, each data file existing outside of the first database, and at least one program, each program processing at least one of the data files and existing outside of the first database, a data management system comprising:

query input means for receiving a query;

database retrieval means for retrieving at least one first data unit from the first database according to the query received by the query input means;

an external relation database, provided separately from the first database, for storing at least one second data unit each second data unit including external relation information that associates one of the plurality of first data units stored in the first database with at least one of the data files and with at least one of the at least one program;

instruction receiving means for receiving an instruction;

external relation retrieval instruction means for giving the database retrieval means a retrieval instruction to retrieve at least one of the at least one second data unit from the external relation database, said database retrieval means further retrieving from said external relation database the second data unit corresponding to the first data unit retrieved from the first database;

program invoking means for invoking, in response to the instruction received by the instruction receiving means, at least one related program of the at least one program to process at least one related data file of the plurality of data files, the at least one related program and the at least one related data file associated with the at least one first data unit by the external relation information included in the retrieved second data unit.

2. A data management system as defined in claim 1, wherein:

the first data unit stored in the first database includes an identifier which identifies the first data unit, a data body which represents a main data, and a keyword to be used for retrieving the data unit, the second data unit includes an identifier which identifies the second data unit, a data body which represents at least one data file name and at least one program name, and a keyword corresponding to the identifier of the first data unit stored in said first database, the query input means receives a first search key as a query, said database retrieval means retrieving the first data unit having the keyword corresponding to the first search key from said first database, said external relation retrieval instruction means generates a second search key corresponding to the identifier of the first data unit retrieved from said first database, and gives it to the database retrieval means as the retrieval instruction, the database retrieval means further retrieves from said external relation database the at least one of the second data unit having the keyword corresponding to the second search key given by the external relation retrieval instruction means, and said program invocation means invokes the at least one of the program to process the at least one related data file in accordance with the data file name and the program name included in the second data unit retrieved by said database retrieval means.

3. In a computer system that includes a first database that stores a plurality of data units, a plurality of data files, each data file existing outside of the first database, and at least one program, each program processing at least one of the plurality of data files and existing outside of the first database, a data management system comprising:

query input means for receiving a query;

database retrieval means for retrieving at least one data unit from the first database according to the query received by the query input means;

external relation storing means, provided separately from the first database, for storing at least one item of external relation information, each item associating at least one of the plurality of data units stored in the first database with at least one of the plurality of data files and with at least one of the at least one program;

instruction receiving means for receiving an instruction;

program invoking means for retrieving the item of external relation information associated with the at least one data unit retrieved by the database retrieval means, and for invoking, in response to the instruction received by the instruction receiving means, at least one related program of the at least one related program that processes at least one related data file of the plurality of data files, the at least one related program and the at least one related data file associated with the at least one data unit by the retrieved item of external relation information.

4. A data management system as defined in claim 3, wherein:

said external relation storing means stores the external relational information in a form of a table which includes at least one entry, each entry having an identifier corresponding to one of the plurality of data units stored in said first database, at least one data file name and at least one program name, and said program invocation means retrieves from said external relation storing means at least one entry whose identifier corresponds to that of the at least one data unit retrieved by the database retrieval means, and invokes the at least one program to process the at least one related data file in accordance with the data file name and the program name included in the retrieved entry.

5. A data management system as defined in claim 3, further comprising file format relation storing means for storing file format relation which relates a file format to a program for processing a data file defined by the file format, wherein said program invocation means comprises:

file determining means for determining the at least one of the data files which is related to the first data unit retrieved by said database retrieval means in accordance with the external relational information stored in the external relationship storing means;

file format determining means for determining the file format corresponding to the at least one data file determined by said file determining means; and program determining means for determining the it least one related program for processing the at least one related data file determined by said file determining means in accordance with the file format determined by said file format relation stored in said file format relation storing means.

6. A data management system as defined in claim 5, wherein said external relation storing means further stores a file format corresponding to each of the data file, and said file format determining means determines the file format by retrieving the file format corresponding to the data file determined by said file determining means from said external relation storing means.

7. A data management system as defined in claim 3, further comprising external relation editing means for adding a new item of external relational information to said external relationship storing means, and for modifying or eliminating the external relational information stored in said external relation storing means.

8. A data management system as defined in claim 3, further comprising an interface display means that includes:

a search key input area for inputting a search key as the query received by the query input means;

a database retrieval indicating area for indicating the retrieval of the data unit from said first database using the search key inputted in the search key input area, which is executed by said database retrieval means;

a retrieval result display area for displaying the content of the data unit retrieved by said database retrieving means; and a program invocation indicating area for indicating the instruction to invoke the program related to the data unit displaying in said retrieval result display area, the instruction received by the instruction receiving means.

9. A data management system as defined in claim 8, wherein said program invocation indicating area accepts the indication only if the external relational information corresponding to the data unit retrieved from said first database exists.

10. A data management method for managing a first database that stores a plurality of data units, a plurality of data files, each data file existing outside of said first database, and at least one program, each program processing at least one of said data files and existing outside of said first database, the method comprising:

registering beforehand at least one item of external relational information, each item relating the data unit stored in said first database to at least one of the data files and at least one of the at least one program;

receiving a query;

retrieving at least one of the data units from said first database according to the query;

retrieving at least one item of the external relational information corresponding to the retrieved data unit from the at least one registered item of the external relational information;

receiving an instruction; and invoking at least one related program for processing at least one related data file of the plurality of data files from the at least one program, the at least one related program and the at least one data file related to the retrieved data unit retrieved from the first database by the retrieved external relational information in response to the received instruction.

11. A data management method for managing a first database that stores a plurality of first data units, each first data unit including an identifier to identify the data unit, a data body which represents main data, and a keyword to retrieve the first data unit, a plurality of data files, each data file existing outside of said first database and at least one program, each program processing at least one of said data files and existing outside of said first database, the method comprising:

registering beforehand at least one item of external relational information, each item relating the data unit stored in said first database to at least one of the data files and at least one of the at least one program, each item of the external relational information in a form of a second data unit, the second data unit including an identifier to identify the second data unit, a file name and a program name as a data body, and a keyword to retrieve the second data unit corresponding to the identifier of the first data unit stored in the first database;

receiving a first search key;

retrieving from said first database at least one of the first data units having a keyword corresponding to the received first search key;

generating a second search key to retrieve the external relational information in accordance with the identifier of the first data unit retrieved from said first database;

retrieving at least one second data unit of the external relational information having a keyword corresponding to the second search key;

receiving an instruction; and invoking at least one related program for processing at least one related data file of the data files of the at least one program, the at least one related program and the data file related to the first data unit retrieved from said first database by the retrieved external relational information in response to the received instruction.

12. A data management method for managing a first database that stores a plurality of data units, a plurality of data files, each data file existing outside of said first database, and at least one program, each program processing at least one of said data files and existing outside of said first database, the method comprising:

registering beforehand at least one item of external relational information each item relating one of the data units stored in the first database to at least one of the data files and at least one of the at least one program;

registering beforehand at least one item of file format relation, each item of file format relation relating a file format to a program for processing a data file defined by that file format;

receiving a query;

retrieving at least one of the data units from said first database in accordance with the query;

retrieving at least one item of the external relational information in accordance with the retrieved data unit from the at least one registered tem of the external relational information;

determining the file format of the data file which is related to the retrieved data unit by the retrieved external relational information;

retrieving the file format relation from the at least one registered item of file format relation in accordance with the determined file format;

receiving an instruction; and invoking at least one related program related to the determined file format by the retrieved file format relation of the at least one program, the at least one related program processing at least one of the data files related to the data unit retrieved from the first database by the retrieved external relational information in response to the received instruction.

* * * * *